United States Patent
Olivier et al.

(10) Patent No.: US 7,142,826 B2
(45) Date of Patent: Nov. 28, 2006

(54) PORTABLE RADIOTELEPHONE AND RADIOCOMMUNICATION SYSTEM INCLUDING SUCH A RADIOTELEPHONE

(75) Inventors: Henri-Nicolas Olivier, Levallois (FR); Guy-Louis Grau, Lyons (FR); Peng Zhang, Charenton le Pont (FR); Martin Pourriot, Charenton le Pont (FR); Fabrice Devige, Vannes (FR)

(73) Assignee: Inventel Systems, Paris (FR)

( * ) Notice: Subject to any disclaimer, the term of this patent is extended or adjusted under 35 U.S.C. 154(b) by 235 days.

(21) Appl. No.: 10/602,984

(22) Filed: Jun. 24, 2003

(65) Prior Publication Data
US 2004/0127189 A1   Jul. 1, 2004

(30) Foreign Application Priority Data
Jun. 25, 2002   (FR) ................................. 02 07858

(51) Int. Cl.
*H04B 1/38* (2006.01)
*H04M 1/00* (2006.01)

(52) U.S. Cl. ............... 455/90.3; 455/575.1; 379/426; 379/428.01

(58) Field of Classification Search ............... 455/350, 455/411, 347, 351, 575, 100, 90.1–90.3, 575.1–575.8; 379/38, 207, 24, 187, 188, 25, 79, 74, 426, 379/428.01, 428.04, 433.05, 434, 438, 447
See application file for complete search history.

(56) References Cited

U.S. PATENT DOCUMENTS

| | | | |
|---|---|---|---|
| 5,757,929 A * | 5/1998 | Wang et al. ................. 381/300 |
| 5,995,589 A | 11/1999 | Cronin et al. .................. 379/38 |
| 6,067,356 A | 5/2000 | Lautenschlager et al. ... 379/207 |
| 6,091,832 A * | 7/2000 | Shurman et al. ............ 381/381 |
| 6,574,324 B1* | 6/2003 | Malik ..................... 379/210.01 |
| 6,707,924 B1* | 3/2004 | Okiebisu .................... 381/385 |
| 2002/0037751 A1* | 3/2002 | Nagase ...................... 455/565 |
| 2002/0074370 A1* | 6/2002 | Quintana et al. ........... 224/262 |
| 2002/0142738 A1* | 10/2002 | Jambie et al. ................ 455/90 |
| 2003/0040298 A1* | 2/2003 | Heatley ..................... 455/411 |
| 2003/0114899 A1* | 6/2003 | Woods et al. ................. 607/60 |
| 2005/0032475 A1* | 2/2005 | Mauney et al. ............ 455/41.2 |

FOREIGN PATENT DOCUMENTS

| | | |
|---|---|---|
| DE | 198 36 594 | 2/2000 |
| DE | 200 20 096 U1 | 3/2001 |
| JP | 9 64950 | 7/1997 |

OTHER PUBLICATIONS

French Search Report, Appl. FR/0207858 dated Mar. 19, 2003.

* cited by examiner

*Primary Examiner*—Naghmeh Mehrpour
(74) *Attorney, Agent, or Firm*—McCracken & Frank LLP

(57) ABSTRACT

Portable radiotelephone including a central processing unit, a transmit and receive radio circuit connected to at least one antenna, a microphone emerging upwards when the radiotelephone is worn by means of a necklace, a speaker and a keypad that includes at least one multifunction key.

15 Claims, 2 Drawing Sheets

PORTABLE RADIOTELEPHONE AND RADIOCOMMUNICATION SYSTEM INCLUDING SUCH A RADIOTELEPHONE

FIELD OF THE INVENTION

The present invention relates to portable radiotelephones and to radiocommunication systems including such radiotelephones.

More particularly the invention relates to a portable radiotelephone comprising at least, a central processing unit, a transmit and receive radio circuit connected to at least one antenna, a microphone, a front face where a speaker emerges, an upper section substantially perpendicular to the front face, a keypad that comprises at least one multifunction key, and a necklace designed for placing around the neck of the user, the said necklace being fixed to the portable radiotelephone in such a way that the said portable radiotelephone positions itself automatically by gravity with its microphone emerging above the speaker, the central processing unit being adapted to:

on receiving an incoming to call, establish a bidirectional communication when a user presses the multifunction key, and when the user presses the multifunction key when there is no incoming call, call at least one predetermined telephone address.

BACKGROUND OF THE INVENTION

Portable radiotelephones of this type are well suited for use under normal conditions by healthy adults. But since they are relatively very complex, they are not suitable for use in emergency situations and/or by sick people, dependent elderly people or children.

SUMMARY OF THE INVENTION

In particular, document JP-A-09064950 describes a radiotelephone of this type, which, however, needs to be hand-held, making its use arduous, particularly for infirm people or children.

The present invention aims in particular to overcome this drawback.

To this end, according to the invention, a portable radiotelephone of the type in question is characterized in that the microphone emerges upwards in the upper section of the radiotelephone, and in that the radiotelephone is capable of being used without being moved when it is worn around the neck of the user.

Because of these arrangements, use of the portable radiotelephone according to the invention is particularly simple since it can be used directly when it is hung around the neck of the user. This portable radiotelephone is therefore well suited for use in emergency situations and/or by sick people, dependent elderly people or children.

In preferred embodiments of the invention, recourse may if necessary be had, moreover, to one and/or other of the following arrangements:

the central processing unit is adapted to sequentially and cyclically call several telephone addresses belonging to a predetermined list, until a communication is established with one of these telephone addresses, when the user presses the multifunction key when there is no incoming call;

the central processing unit is adapted to automatically call back a telephone address of the said predetermined list when the central processing unit called this telephone address after operation of the multifunction key and when this telephone address was busy;

the predetermined list of telephone addresses comprises a number n of telephone addresses and the central processing unit is adapted to call a telephone address of position k in the said list when the user presses the multifunction key p times, where p=k modulo n;

the central processing unit is adapted to interrupt an established communication or an in-progress call when the user presses the multifunction key for a duration greater than a predetermined duration, the said predetermined duration being at least equal to 1 s;

the front face includes the multifunction key, the keypad not including any other key arranged on the said front face;

the portable radiotelephone additionally comprises a rear face, on the side opposite the front face, this rear face comprising additional keys belonging to the keypad, which additional keys are designed to allow a user to dial a telephone number of his choice;

the portable radiotelephone takes the form of a medallion;

the central processing unit is adapted to recognize at least certain incoming calls, referred to as telemonitoring calls, from at least one predetermined telephone address, and when the central processing unit identifies a telemonitoring call, to automatically establish a communication with this predetermined telephone address without notifying the user;

the central processing unit is adapted to activate the microphone and keep the speaker deactivated when the said central processing unit automatically activates a communication after a telemonitoring call;

the central processing unit is adapted to transmit a predetermined identification signal when a communication is being established with the said at least one predetermined telephone address when the user presses the multifunction key when there is no incoming call;

the portable radiotelephone includes an independent electrical power source and the central processing unit is adapted to measure a charge level of the said power source and to send a warning message to a predetermined address when the charge level falls to below a predefined level.

Furthermore, a subject of the invention is a radiocommunication system including a portable radiotelephone as defined above and a base station connected to a public network and communicating by wireless link with the said portable radiotelephone.

Advantageously, the portable radiotelephone includes an independent electrical power source and the central processing unit is adapted to measure a charge level of the said power source and communicate it to the base station (upon its own initiative or on request from the base station), the base station being designed to memorize the said charge level and transmit it to a predetermined telephone address (at regular intervals, or upon a call from this address that may for example be the address of a computer messaging server).

Furthermore, the base station may be designed to memorize periods during which it stops being linked with the portable radiotelephone, and to communicate these periods to a predetermined telephone address (at regular intervals, or upon a call from this address, or, alternatively, when the link is lost for more than a predetermined time).

BRIEF DESCRIPTION OF THE DRAWINGS

Other features and advantages of the invention will become apparent during the following description of one of its embodiments, given by way of non-limiting example, with reference to the accompanying drawings.

In the drawings.

MORE DETAILED DESCRIPTION

In the various figures, the same references are used to indicate identical or similar elements.

Figure 1:
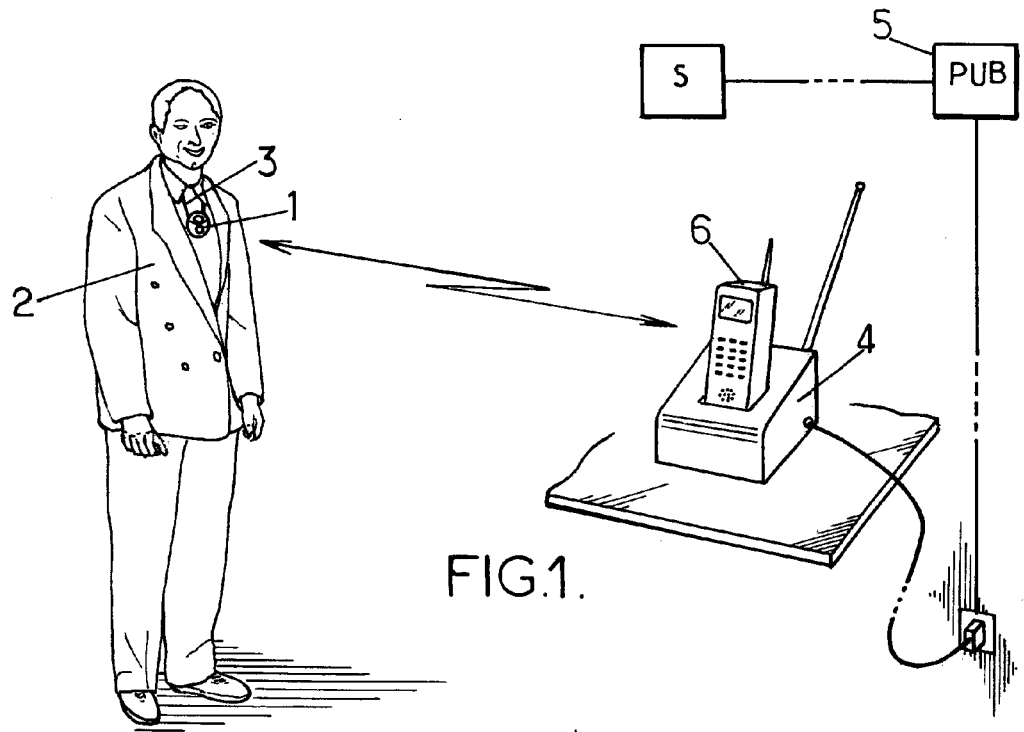
FIG. 1 is a schematic view of a radiocommunication system including a portable radiotelephone according to an embodiment of the invention.

As represented in FIG. 1, the invention concerns a portable radiotelephone 1 that is intended to be worn permanently by a user 2 who may for example be sick, a dependent elderly person or a child so that in particular the user can make emergency calls.

Advantageously, this portable radiotelephone 1 may take the form of a medallion suspended from a cord 3 forming a necklace placed around the neck of the user 2. The portable radiotelephone 1 could, however, be attached in another way, for example on an arm of the user 2.

The radiotelephone 1 may for example form part of a private radiocommunication network operating using the DECT radiocommunication protocol and communicating with a fixed base station 4 that may for example be connected, by wire or otherwise, to the public switched telephone network 5 (PUB). Moreover, if necessary the fixed base station 4 may serve as a recharging base to recharge the batteries of the radiotelephone 1 and/or of other conventional radiotelephones 6 belonging to the same private radiocommunication network.

It will be noted that the radiotelephone 1 could just as well operate according to another, private radiocommunication network protocol (for example the BLUETOOTH protocol), or a public radiocommunication network protocol (for example the GSM protocol or the UMTS protocol).

Figure 2:
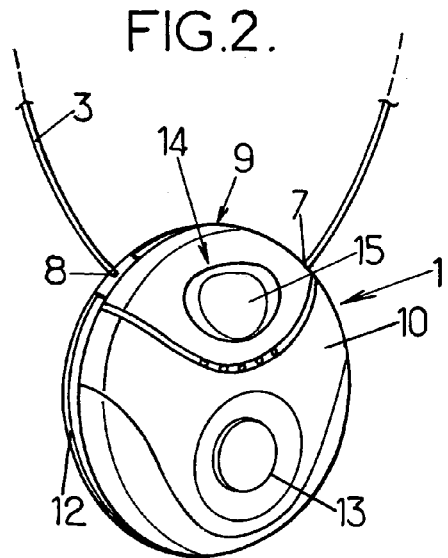
FIGS. 2 and 3 are perspective views showing respectively the front face and the rear face of the portable radiotelephone of FIG. 1.
Figure 3:
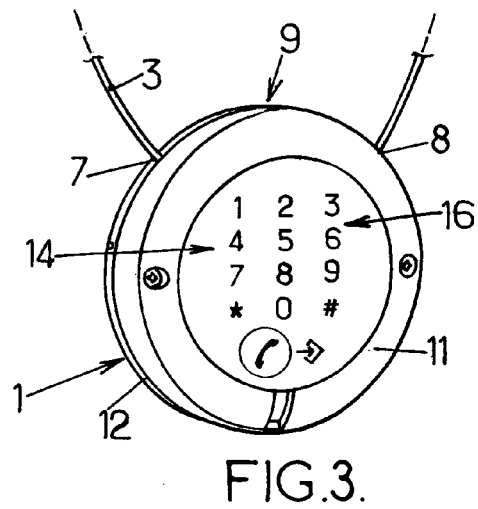
Figure 4:
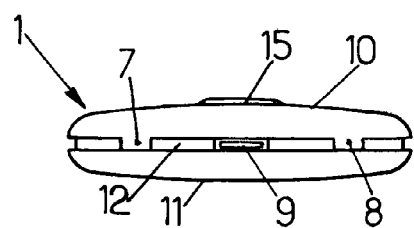
FIG. 4 is a top view of the portable radiotelephone of FIGS. 2 and 3.

As shown in FIGS. 2 to 4, the cord 3 forming the necklace is preferably fixed at two points 7, 8 located near the top end of the portable radiotelephone 1, such that this radiotelephone positions itself automatically, through the effect of gravity, with the air channel 9 of its microphone directed substantially towards the head of the user.

In the particular example considered here, the casing of the radiotelephone 1 has two main faces, that is a front face 10 and a rear face 11 separated from one another by an edge face 12, and the air channel 9 providing access to the microphone is located on the edge face 12 of the casing of the radiotelephone.

As shown in FIG. 2, the front face 10 of the radiotelephone, intended to be oriented in the forward-facing direction of the user 2 when the latter wears the radiotelephone as a necklace, additionally includes a speaker 13, or at the very least an air channel providing access to the speaker of the radiotelephone. Owing to this arrangement, in which the speaker 13 is arranged substantially perpendicularly to the air channel 9 providing access to the microphone, interference between the speaker and the microphone is prevented or at the very least greatly limited, thus enabling a very good sound quality to be achieved.

Figure 5:
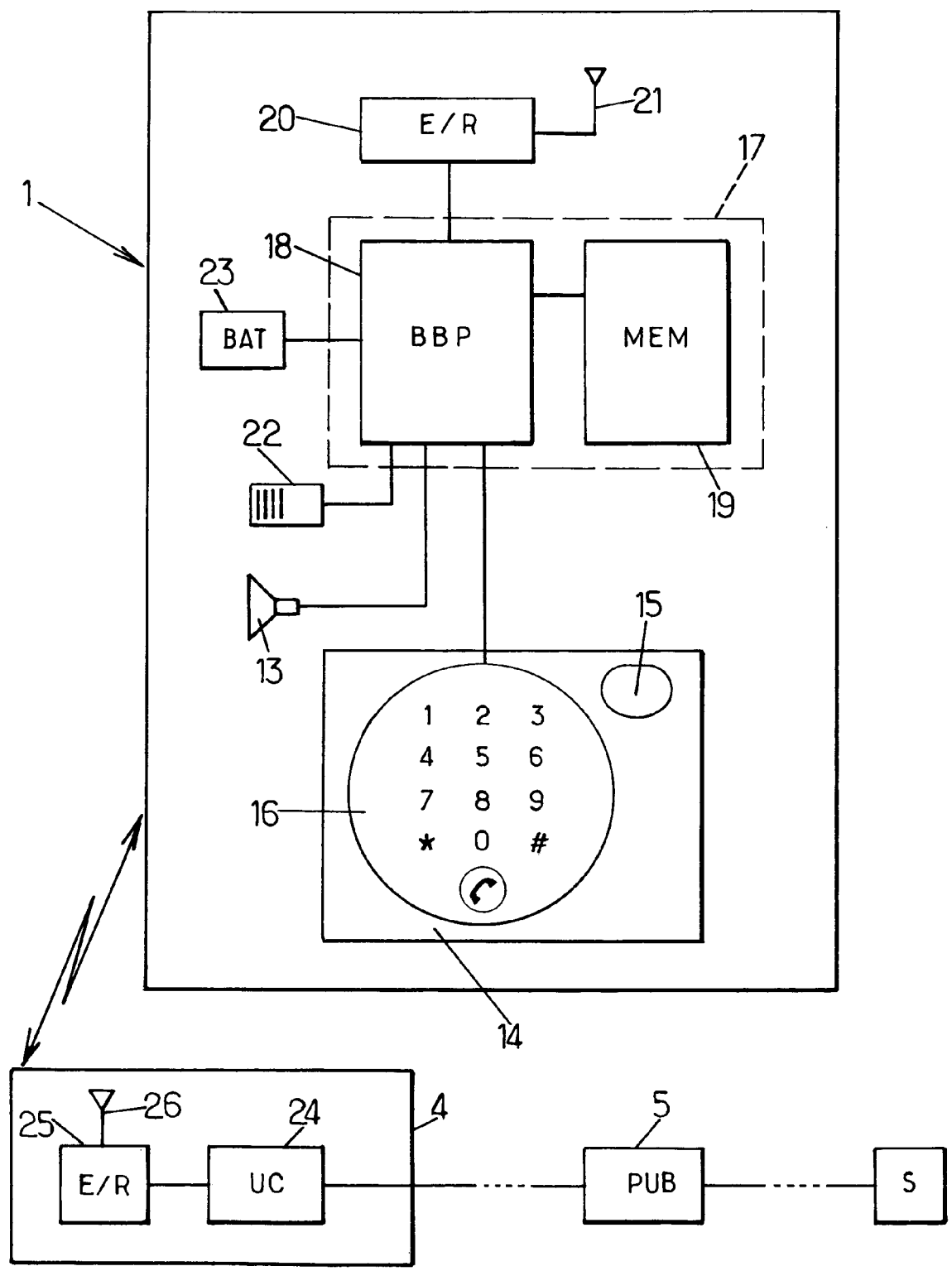
FIG. 5 is a block diagram showing part of the electronic circuit of the portable radiotelephone of the above figures.

Furthermore, as shown in FIGS. 2 and 3, the radiotelephone additionally includes a keypad 14 that comprises:

a multifunction key 15 located on the front face 10 of the radiotelephone, and a set of keys 16, consisting of dialling keys and a call key, located on the rear face 11 of the radiotelephone, normally against the chest of the user 2. As represented in FIG. 5, the radiotelephone 1 may have a central processing unit 17 that includes for example a baseband processor (BBP) 18 (that itself generally includes several modules) connected if necessary to an external memory 19. The processor 18 is connected to a transmit and receive radio circuit 20 (T/R), which is itself connected to at least one transmit/receive antenna (21).

Furthermore, the processor 18 is connected (directly or where necessary via interface circuits that are not represented here for reasons of clarity):

to a microphone 22 in communication with the abovementioned air channel 9, to the speaker 13 described above, to the keypad 14 comprising the multifunctional key 15 and the set of keys 16, and to a, generally rechargeable, battery 23 for which the processor 18 can measure the charge level.

Furthermore, the fixed base station 4 may include a central processing unit 24 (CPU) that is identical or similar to the central processing unit 17 of the radiotelephone 1, which central processing unit 24 is connected to a transmit and receive radio circuit 25 (T/R) that is identical or similar to the abovementioned circuit 20 and is itself connected to one or more antennas 26, the central processing unit 24 being, moreover, connected to the public switched telephone network 5.

The device just described operates as follows.

Upon receiving an incoming call, the user need simply briefly press the multifunction key 15 in order that the central processing unit 17 go off-hook and establish bidirectional communication with the person who is calling.

Furthermore, when the user 2 wishes to make a call to a telephone address included in a predetermined list that is stored in the memory 19 of the central processing unit 17, he need simply briefly press the multifunction key 15, after which the central processing unit 17 sequentially and cyclically calls the various telephone address included in the predetermined list in question, until communication can be established with one of these numbers. The user 2 can then talk to the person at the called number. This mode of operation is particularly useful for emergency calls.

In this mode of operation, when a telephone address called by the central processing unit 17 is busy, the central processing unit 17 may if necessary be adapted to call this telephone address back after a predetermined time interval, before switching to the next telephone address in the list that it has in memory.

It will be noted that, where necessary, the list in question could be reduced to one single telephone address.

If this list contains several addresses, the user 2 can furthermore choose the telephone address that he wishes to call from within the predetermined list of telephone addresses. To this end, when the user 2 wants to reach a telephone address occupying position k in the list of n telephone addresses, he need simply briefly press p times on the multifunction key 15, where p=k modulo n, n being an integer greater than 1.

The central processing unit 17 is also adapted to interrupt an in-progress call, or interrupt dialling, when the user holds the multifunction key 15 pressed, for example for a duration greater than 1 second, or even for a duration greater than 2 or 3 seconds.

Furthermore, the radiotelephone 1 is designed to operate according to a conventional mode of operation also, by using the set of keys 16 located at the back of the casing of the telephone, to call telephone numbers other than those included in the list of telephone addresses.

Advantageously, the device according to the invention may be used to remotely monitor the user 2 who is wearing the radiotelephone 1. By way of example, the radiotelephone 1 can thus be used by medical personnel to remotely monitor the state of health of a patient.

To this end, the central processing unit 17 may be adapted to identify at least certain incoming calls, referred to as telemonitoring calls. When it identifies such a telemonitoring call, the central processing unit 17 automatically establishes communication with the calling number without notifying the user and in particular without making the radiotelephone 1 ring or vibrate. In this case, the central processing unit 17 may be adapted to enable monitoring personnel to only listen to the user 2 via the microphone 22, without being able to speak to the user 2. In other words, in this case, the central processing unit 17 can activate the microphone 22 but keep the speaker 13 deactivated.

The central processing unit may also be adapted to transmit a predetermined identification signal for example a "DTMF"-type signal or other, when a call is being established with one of the telephone addresses in the predetermined list, so that the user 2 who has just initiated an emergency call can be identified positively and quickly.

The central processing unit 17 may also be adapted to measure the charge level of its battery 25 and send a warning message to a predetermined telephone address, for example to a server S at a telemonitoring service provider, when the charge level of this battery 25 falls to below a predefined level. The service provider in question can then check the situation and make sure that the radiotelephone 1 will definitely be recharged in due course.

If necessary, the information concerning the charge level of the battery 23 may be transmitted to the fixed base station 4 by the radiotelephone 1 (for example at regular time intervals), after which the fixed base station 1 communicates the said battery charge information over the public switched telephone network 5 to the abovementioned server S (this communication may or may not be regular, and may be initiated either by the base station 4 or by the server S).

Finally the central processing unit 24 of the fixed base station 4 may detect periods during which the radiotelephone 1 is outside the radio range of the said fixed base station. These periods may advantageously be memorized by the central processing unit 24 of the fixed base station 4 and communicated to the abovementioned server S (regularly or according to certain criteria, for example if the period of loss of link is longer than a predetermined duration). In this case as in the previous case, the information may be communicated to the server S either on the initiative of the fixed base station 4 or upon request from the server S.

We claim:

1. Portable radiotelephone comprising at least:
   a central processing unit,
   a transmit and receive radio circuit connected to at least one antenna,
   a front face including a speaker,
   an edge substantially perpendicular to the front face,
   a keypad that comprises at least one key,
   and a necklace designed for placing around the neck of the user, said necklace being fixed to the portable radiotelephone in such a way that said portable radiotelephone positions itself automatically by gravity in a rest position when said necklace is worn around the neck of the user, the central processing unit being adapted to:
   on receiving an incoming call, establish a communication when a user presses at least one key,
   and when the user presses at least one key when there is no incoming call, call at least one predetermined telephone address,
   wherein a microphone is located on the radiotelephone and the microphone and the speaker are desianed to let the user use the radiotelephone to communicate without moving said radiotelephone from said rest position when said radiotelephone is worn around the neck of the user.

2. Radiotelephone according to claim 1, in which the central processing unit is adapted to sequentially and cyclically call several telephone addresses belonging to a predetermined list, until a communication is established with one of these telephone addresses, when the user presses at least one key when there is no incoming call.

3. Portable radiotelephone according to claim 2, in which the central processing unit is adapted to automatically call back a telephone address of the said predetermined list when the central processing unit called this telephone address after operation of at least one key and when this telephone address was busy.

4. Radiotelephone according to claim 2, in which the predetermined list of telephone addresses comprises a number n of telephone addresses and the central processing unit is adapted to call a telephone address of position k in the said list when the user presses at least one key p times, where p=k modulo n.

5. Radiotelephone according to claim 1, in which the central processing unit is adapted to interrupt an established communication or an in-progress call when the user presses at least one key for a duration greater than a predetermined duration, the said predetermined duration being at least equal to 1 s.

6. Radiotelephone according to claim 1, in which the front face includes a multifunction key, the keypad not including any other key arranged on the front face.

7. Radiotelephone according to claim 6, additionally comprising a rear face, on the side opposite the front face, this rear face comprising additional keys belonging to the keypad, which additional keys are designed to allow the user to dial a telephone number of his choice.

8. Radiotelephone according to claim 1, taking the form of a medallion.

9. Radiotelephone according to claim 1, in which the central processing unit is adapted to:
   recognize at least certain incoming calls, referred to as telemonitoring calls, from at least one predetermined telephone address, and when the central processing unit identifies a telemonitoring call, to automatically establish a communication with this predetermined telephone address without notifying the user.

10. Radiotelephone according to claim 9, in which the central processing unit is adapted to activate the microphone and keep the speaker deactivated when the said central processing unit automatically activates a communication after a telemonitoring call.

11. Radiotelephone according to claim 1, in which the central processing unit is adapted to transmit a predetermined identification signal when a communication is being established with the said at least one predetermined telephone address when the user presses at least one key when there is no incoming call.

12. Radiotelephone according to claim 1, comprising an independent electrical power source and in which the central processing unit is adapted to measure a charge level of the said power source and to send a warning message to a predetermined address when the charge level falls to below a predefined level.

13. Radiocommunication system comprising a portable radiotelephone according to claim 1 and a base station connected to a public network and communicating by wireless link with the said portable radiotelephone.

14. Radiocommunication system according to claim 13, in which the portable radiotelephone includes an independent electrical power source and the central processing unit of the radiotelephone is adapted to measure a charge level of the said power source and to communicate the charge level to the base station, the base station being designed to memorize the said charge level and to transmit it to a predetermined telephone address.

15. Radiocommunication system according to claim 13, in which the base station is designed to memorize periods during which it stops being in communication with the portable radiotelephone, and to communicate these periods to a predetermined telephone address.

* * * * *

UNITED STATES PATENT AND TRADEMARK OFFICE
CERTIFICATE OF CORRECTION

PATENT NO. : 7,142,826 B2  Page 1 of 1
APPLICATION NO. : 10/602984
DATED : November 28, 2006
INVENTOR(S) : Olivier It is certified that error appears in the above-identified patent and that said Letters Patent is hereby corrected as shown below:

At column 6, line 22 please change "desianed" to --designed--.

Signed and Sealed this

Third Day of April, 2007

JON W. DUDAS
*Director of the United States Patent and Trademark Office*